United States Patent [19]

Kern et al.

[11] 4,361,808

[45] Nov. 30, 1982

[54] DIELECTRIC CONSTANT WELL LOGGING WITH CURRENT AND VOLTAGE ELECTRODES

[75] Inventors: John W. Kern, Houston; Michael M. Spann, Dublin; Wilmer A. Hoyer, Houston, all of Tex.

[73] Assignee: Exxon Production Research Co., Houston, Tex.

[21] Appl. No.: 130,947

[22] Filed: Mar. 17, 1980

[51] Int. Cl.³ .................... G01V 3/24; G01R 25/00
[52] U.S. Cl. ............................. 324/366; 324/83 R; 324/83 D
[58] Field of Search ............ 324/355, 323, 357, 362, 324/366, 82, 83 R, 83 A, 83 D

[56] References Cited

U.S. PATENT DOCUMENTS

| | | | |
|---|---|---|---|
| 2,592,101 | 4/1952 | Aiken | 324/355 |
| 2,988,690 | 6/1961 | Love et al. | 324/362 |
| 3,895,289 | 7/1975 | Rickey et al. | 324/323 |
| 4,015,195 | 3/1977 | Hoyer et al. | 324/355 |
| 4,236,113 | 11/1980 | Wiley | 324/366 |

OTHER PUBLICATIONS

Staffin, Robert, 6 Ways to Measure Phase Angle Control Engineering, Oct. 1965, pp. 78–83.

*Primary Examiner*—Gerard R. Strecker
*Attorney, Agent, or Firm*—James S. Hsue

[57] ABSTRACT

This invention provides for methods and systems for measuring the dielectric constant of an earth formation. In a preferred embodiment, an alternating current is passed through a portion of the formation and a reference resistor in series with the portion. The capacitance and the dielectric constant of the portion may be determined from the phase difference between the voltage across the reference resistor and the voltage across the portion. This phase difference may be obtained by generating a voltage which is in phase with the voltage across the reference resistor, but which has the magnitude of the voltage across the portion. To obtain the phase difference by an alternate digital method, the voltage across the referenced resistor and the voltage across the portion are each transformed into a square wave signal. The two square wave signals are then compared to obtain the sign and the magnitude of the phase difference between the two square waves. In an alternate preferred embodiment, an alternating current is passed through the portion of the earth formation and through a capacitor and a resistor connected in series with the portion. The first DC signal is generated by filtering out the high frequency components from the product of the voltages across the capacitor and across the portion. A second DC signal is generated by filtering out the high frequency components from the product of the voltages across the referenced resistor and across the portion. The phase difference between the voltage across the portion and the current through the portion may be determined, from which the capacitance and the dielectric constant of the portion may then be calculated.

11 Claims, 11 Drawing Figures

| $E_B$ LAGGING $E_A$<br>($\emptyset < 0$) | | $E_A$ LAGGING $E_B$<br>($\emptyset > 0$) |
|---|---|---|
|  | $E_A$ |  |
|  | $E_B$ |  |
|  | $\overline{E_A}$ |  |
|  | $\overline{E_B}$ |  |
|  | $E_A + \overline{E_B}$ |  |
|  | $\overline{E_A} + \overline{E_B}$ |  |
|  | $\overline{(\overline{E_A} + \overline{E_B})}$ |  |
|  | $E_A{}'$ |  |
|  | $E_A + \overline{E_B} + E_A{}'$ |  |

DIELECTRIC CONSTANT WELL LOGGING WITH CURRENT AND VOLTAGE ELECTRODES

BACKGROUND OF THE INVENTION

1. Field of the Invention

The invention relates in general to the investigation of subsurface earth formations and in particular to methods and systems for measuring the dielectric constants of earth formations adjacent to a bore hole.

2. Description of the Prior Art

Normally earth formations having a high brine saturation will exhibit a low electrical resistivity while formations having a high oil saturation will exhibit a high electrical resistivity. Frequently shaliness of the formations causes formations having high oil saturation to have low electrical resistivities. It is therefore useful, in assessing the oil bearing potentials of earth formations, to be able to determine if the low resistivities are caused by shaliness of the formations. In U.S. Pat. No. 3,895,289 (1975), Rickey et al disclose a method to determine the effects of shaliness on electrical resistivity. The dielectric constants of earth formations are measured at frequencies below 50 KHz. The dielectric constant of a formation, measured at frequencies below 50 KHz, has been determined to be related to the portion of the electrical conductivity due to shaliness. See "Low Porosity Gas Sand Analysis using Cation Exchange and Dielectric Constant Data" by Kern et al in Trans. SPWLA XVII (June 1976). Therefore, methods capable of measuring in-situ the electrical resistivities and dielectric constants of earth formations at frequencies below 50 KHz are valuable in revealing information concerning oil potential in the earth formations.

Laboratory tests have shown that when an alternating electric current is passed through shaly materials and the capacitances are measured, the capacitances of the shaly materials decrease rather rapidly when the frequency of the current increases. For example, with a five percent by weight suspension of bentonite in a 20,000 parts per million NaCl solution the capacitances decrease from about 4,400 p farads at about 60 Hz to almost zero at 100 KHz. Most capacitance measurements on clay suspensions in brine have shown a similar relationship between capacity and frequency. The dielectric constants of shaly materials are proportional to the capacitances and thus also decrease with increasing frequency of the current. The results of such laboratory tests are explained in more detail in "Dielectric Constant of Rocks as a Petrophysical Parameter" by Hoyer et al in Trans SPWLA XVII (June 1976). Hence the dielectric constants of shaly earth formations at low frequencies, such as those below 50 KHz, may be very different from the dielectric constants of the same formations at high frequencies such as those in the megahertz range. In order that certain well logging systems be adaptable to apply the method disclosed by Rickey et al to determine the effects of shaliness on electrical resistivity, such well logging systems must be capable of measuring dielectric constants at frequencies below 50 KHz.

A number of well logging systems have been used in the prior art to measure in-situ the resistivity and dielectric constants of earth formations in a bore hole. Aiken, in U.S. Pat. No. 2,592,101 (1952), disclosed a system using an impedance bridge to perform such measurements. The impedance bridge used comprises three impedances connected in series but positioned spatially to form three sides of a square. The two unconnected ends of the three impedances are then connected to two electrodes in contact with and moving over the bore hole wall. The three impedances form three arms of the impedance bridge, and the portion of the earth formation between the two electrodes forms the remaining arm of the bridge. Two filters connected in series are connected across a diagonal of the incomplete square formed by the three impedances. The two filters have resonance frequencies at 400 Hz and 20 megahertz, respectively. Alternating current sources of 400 cycles and 20 megacycles are connected across the other diagonal of the incomplete square.

The values of the three impedances in the bridge are preferably chosen so that the bridge is nearly balanced when the impedance between the electrodes across the formation is approximately the minimum formation impedance encountered along the bore hole. As the electrodes move over formations of different impedances, a corresponding unbalance of the bridge is produced. When the 400 Hz alternating current is applied to the bridge the filter with resonance frequency of 20 megahertz has a negligible impedance and substantially all of the 400 Hz unbalance voltage will appear across the filter having a resonance frequency of 400 Hz. At a low frequency of 400 cycles the contribution of the reactance of the portion of the formation to the unbalance voltage compared to that of the resistance is small and the unbalance voltage is presumed to be principally a function of the resistance of the portion of the formation. The unbalance voltage is therefore a measure of the resistance of the portion of the earth formation. When the 20 megahertz alternating current is applied to the bridge, the impedance of the filter having a resonance frequency of 400 Hz is negligable and the unbalance voltage will appear across the filter having a resonance frequency of 20 megahertz. At 20 megahertz the impedance of many formations will be predominantly reactive and the unbalance voltage is assumed to be caused primarily by the reactance of the portion of the formation. The dielectric constant of the portion of the formation may be derived from the unbalance voltage.

Aiken states in the patent specification that for some formations the impedance at 20 megacycles may not be predominantly reactive. Thus for some formations, Aiken's method described above cannot be used to measure the reactance of the formations. To determine the dielectric constants of the earth formations, measurements of both the resistances and reactances of such formations are usually necessary. To measure the resistance and reactance of earth formations at locations along the bore hole the impedance bridge method requires measurements at two different frequencies instead of at only one frequency. More operations time is therefore required. For a substantial range of frequencies between 400 Hz and 20 MHz, particularly those below 50 KHz, the resistive response of the earth formation compared to the reactive response is not negligible and cannot be ignored. Aiken's system for measuring the dielectric constant functions only when the resistive response is negligible. Hence for a substantial range of frequencies below 50 KHz, Aiken's system cannot be used to determine dielectric constants of earth formations.

In the same patent to Aiken, a modified apparatus was disclosed to measure the phase difference between the current and voltage across the formation as an indication of the dielectric constant of the formation. An alternating current source of high frequency such as 20 megahertz is passed through a portion of the formation in series with a resistor. The voltage across the resistor is in phase with the current through the portion of the formation. The voltage across the resistor is supplied to an automatic volume control amplifier which provides an output voltage which is substantially constant in magnitude independent of the voltage input to the amplifier, and the phase of which bears a fixed relation to the phase of the voltage input. The voltage across the formation is also supplied to an automatic volume control amplifier to provide a constant magnitude voltage which bears a fixed phase relation to the phase of the voltage input. The two amplifiers are adjusted to provide output voltages of equal magnitude, but which are 180° out of phase when there is no phase difference between the two input voltages to the two amplifiers. The output voltages of the two amplifiers are applied respectively to two resistors connected in series. Hence, if there is no phase difference between the current and voltage across the formation, the voltage across the two resistors will be equal but 180° out of phase. The voltage across the two resistors is therefore zero. Typically the voltage and current across the formation are not in phase so that the voltage across the two resistors would not be zero, in which case the magnitude of this voltage is a measure of the phase difference between the current and voltage across the formation. This phase difference is known to be a function of the dielectric constant across the portion of the formation.

The automatic volume control amplifier in Aiken's phase detecting apparatus employs a variable gain and feedback device to maintain an output voltage of constant magnitude independent of variations in the input voltage to the amplifier. When the input voltage changes the gain is varied to maintain an output voltage of constant magnitude. When the gain of an amplifier is varied, however, the phase difference between the input and output voltages of the amplifier may also vary. This variable phase difference will be combined with the phase difference between the current and voltage across the formation that is to be determined. The errors may be substantial. It is quite common for the resistivity of an earth formation at one location to be many times that of an adjacent formation along the bore hole. To maintain a constant voltage output at both formations, the amplifier gain must change by a large factor, which may introduce a large phase difference appearing as noise in the phase difference measurements. It may be difficult, therefore, to accurately measure small phase differences between the voltage and the current in the formation using this method.

Aiken discloses still another modified embodiment where a high frequency current source is also used, to pass an alternating current through a portion of a formation in series with a resistor. As discussed earlier the phase difference between the voltage across the resistor and the voltage across the formation portion is the same as the phase difference between current through and voltage across the portion. A voltage bearing a definite phase relation to the voltage across the resistor is applied to the plate of a pentode. The voltage across the formation is applied to an automatic volume control amplifier to provide an output voltage of constant magnitude in phase with the input voltage to the amplifier. This output voltage is applied to the grid of the pentode through a phase adjustor and a variable voltage source. When the voltage across the resistor is in phase with the voltage across the formation portion, the phase adjustor and the variable voltage source are adjusted so that the grid voltage is just sufficient to prevent the flow of plate current. When the two voltages compared are out of phase, plate current will flow through the pentode. The larger the phase difference between the two voltages compared, the larger will be the plate current. The rectified component of this plate current is therefore a measure of the phase difference between the current through and voltage across the formation portion.

The resistance of earth formations may change typically by a large factor from location to location. The gain of the automatic volume control amplifier must change by a similar factor to maintain a constant voltage output. As discussed earlier, this variation in gain may introduce a sizable phase difference added to the phase difference between the two voltage compared, which can appear as a significant error in the measurement. Hence this embodiment cannot be used to accurately measure small phase differences between the current through and voltage across an earth formation or a portion thereof.

Aiken proposes still further systems for measuring the dielectric constants and resistivities of earth formations. Such systems employ the same phase detecting devices as those that have been described, wherein the various drawbacks described above have not been alleviated. Such systems will have the same disadvantages as those discussed earlier.

Cox et al in U.S. Pat. No. 4,012,689 (1977) discloses an induction well logging system for determining the resistivity and dielectric constant of earth materials in the vicinity of a well bore hole. A radio frequency electromagnetic field is generated in a bore hole to induce a secondary electromagnetic field and the total electromagnetic field along longitudinally spaced locations is detected. Measurements of the relative phase shift in the electromagnetic field between the detector locations and the amplitude of the field at one of the detector locations may then be interpreted according to predetermined relationships in terms of the earth formation resistivity and dielectric constant.

Instead of measuring voltages across different circuit components and the phase difference between the voltage and current through the formation, the system proposed by Cox et al measures the amplitude of the electromagnetic wave at one detector location and the relative phase shift in the wave between the detector locations. This system operates only at radio frequencies in the range from 10–60 MHz; it does not operate at lower frequencies. Thus this system cannot be used to measure the dielectric constants of earth formations at frequencies lower than such radio frequencies.

Other examples of induction well logging systems are disclosed in U.S. Pat. No. 3,891,916 (1975) to Meador et al, and in U.S. Pat. No. 3,893,021 (1975) to Meador et al.

U.S. Pat. No. 4,130,793 [1978] issued to Bridges discloses a digital apparatus for measuring the phase shift in an induction logging system as that disclosed by Cox et al discussed above. The electromagnetic field in the formation is detected at two different locations to give two different detector signals. The two signals are amplified and converted into square waves of the same frequencies by means of zero crossing detectors. The converted signals are fed into an exclusive OR gate and the width of the output signal is measured with the aid of an AND gate and a clock in terms of number of clock pulses. The number of clock pulses corresponds to the phase difference between the two detector signals and is a measure of the dielectric constant of the earth formation. This digital apparatus proposed by Bridges cannot, however, detect whether one detector signal is leading or lagging the other detector signal.

SUMMARY OF THE INVENTION

This invention provides for methods and systems for measuring the dielectric constants of earth formations adjacent to a bore hole. In a preferred embodiment, an alternating current is passed through a portion of an earth formation. An electrical signal is generated which has substantially the magnitude of the voltage across said portion but which is substantially in phase with the current through said portion. The capacitance of said portion of the earth formation may then be determined, from which the dielectric constant is calculated.

Alternatively, the dielectric constant of said portion of the earth formation may be obtained by a digital method. An alternating current is passed through a portion of the formation and a reference resistor in series with said portion of the formation. A first square wave signal is generated, which has substantially the same frequency as the voltage across said portion. A second square wave signal is generated, which has substantially the same frequency as the voltage across the reference resistor. The phase angle between the two square waves is measured digitally. The two square waves are compared to provide a signal indicative of the sign of the phase angle between the two square waves. The voltages across the reference resistor and across said portion may be compared digitally to provide a quantity substantially proportional to the resistance of said portion of the earth formation. The capacitance of said portion of the formation is then determined, from which the dielectric constant is calculated.

In an alternate preferred embodiment, an alternating current is passed through a portion of an earth formation, a capacitor and a resistor, wherein the capacitor and the resistor are connected in series with said portion of the earth formation. A first signal is generated, which is substantially proportional to the product of the voltages across the capacitor and across said portion. The high frequency components of the first signal are substantially filtered out. A second signal is generated, which is substantially proportional to the product of the voltages across the reference resistor and across said portion. The high frequency components of the second signal are substantially filtered out. The capacitance of said portion of the earth formation is determined, from which the dielectric constant is calculated.

DESCRIPTION OF THE PREFERRED EMBODIMENT

Figure 1:
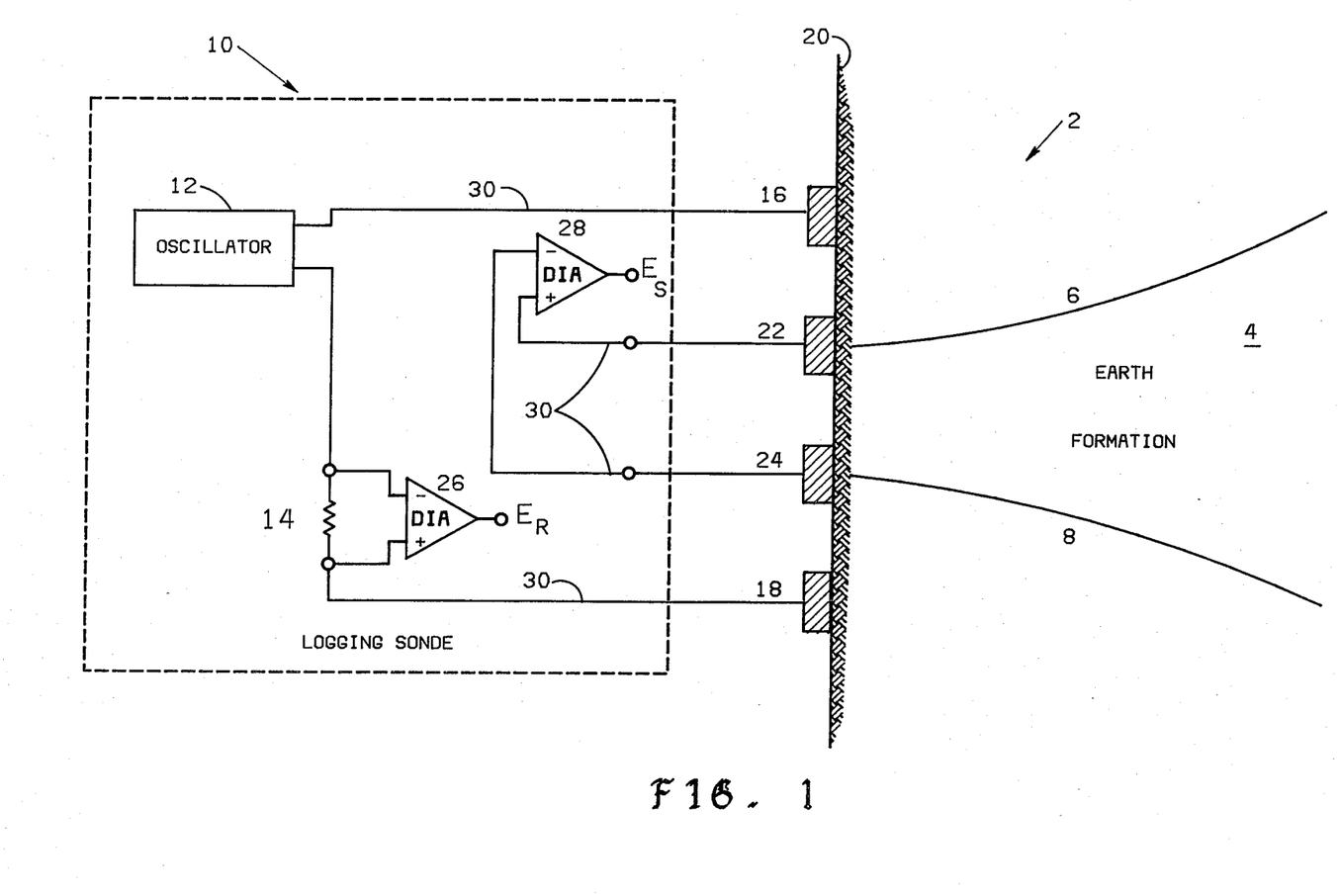
FIG. 1 is a schematic diagram of an electrical circuit constructed according to the invention for passing an alternating current through a subterranean formation traversed by a bore hole and for measuring the voltage across a portion of the formation and across a reference resistor.

FIG. 1 shows an electrical circuit which may be used in accordance with this invention to determine the dielectric constant of an earth formation traversed by a bore hole. An oscillator 12 may be used to pass an alternating current of angular frequency $\omega$ through the earth formation 2 through spaced apart current electrodes 16, 18 and a resistor 14 connected in series with earth formation 2. A pair of spaced apart potential electrodes 22, 24 may be used to measure the voltage across a portion 4 of the earth formation. Potential electrodes 22, 24 are preferably spaced apart from current electrodes 16, 18. A comparison of the voltage across potential electrodes 22, 24 to the voltage across resistor 14 will provide indications of the resistivity and capacitance of portion 4 of the earth formation 2. The electrical circuit shown in FIG. 1 is contained in logging sonde 10 except for the electrodes 16, 18, 22, and 24 which are connected to the electrical circuit inside the sonde by conductors 30. Logging sonde 10 may be suspended in a bore hole to the desired depth in a conventional manner and then positioned in a conventional manner to maintain stable contacts betweens electrodes 16, 18, 22, 24 and bore hole wall 20. For a conventional method is suspending and positioning the logging sonde 10, see U.S. Pat. No. 3,895,289 to Rickey et al (1975).

Figure 2:
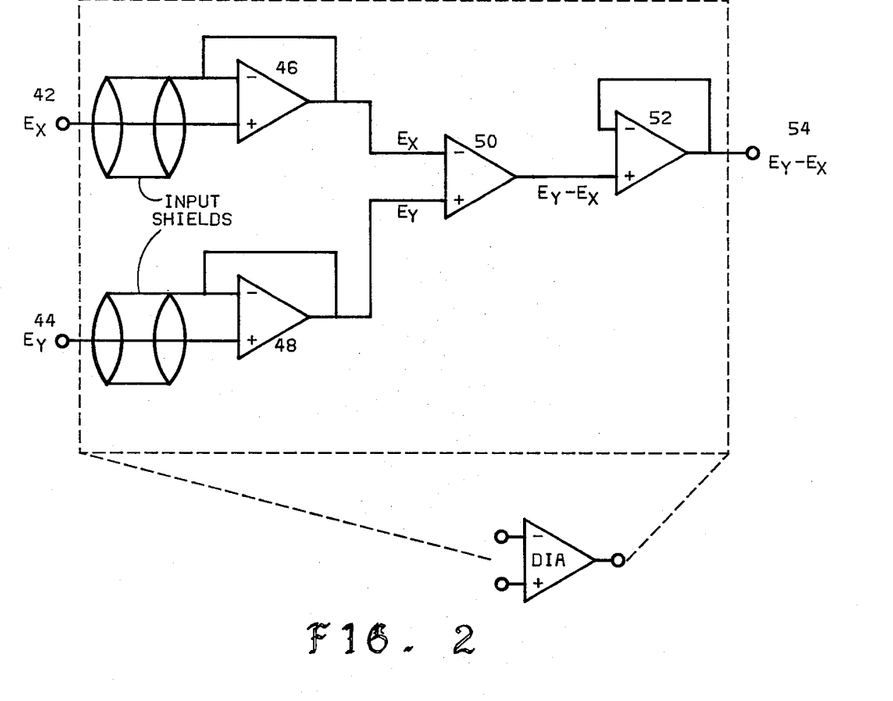
FIG. 2 is a schematic diagram of a differential isolation amplifier used in the circuit in FIG. 1.

The voltages across resistor 14 and across potential electrodes 22, 24 are measured with the aid of differential isolation amplifiers 26, 28 shown in more detail in FIG. 2. Referring to FIG. 2, input terminal 42 is connected to the negative input of operational amplifier 50 through a sheilded voltage follower 46. Similarly, input terminal 44 is connected to the positive input of operational amplifier 50 through a shielded voltage follower 48. Voltage followers have very high input impedance and very low output impedance and provide very effective isolation between the input voltages and output voltages of the voltage followers. The output voltage of the voltage follower, however, is equal in magnitude and phase to the input signal. Therefore, the input signals to operational amplifier 50 are the same as the potential at input terminals 42, 44 except that the input terminals are effectively isolated from operational amplifier 50. Operational amplifier 50 provides an output voltage substantially equal to the potential $E_Y$ at terminal 44 minus the potential $E_X$ at terminal 42. This output voltage is passed through another voltage follower 52 before reaching the output terminal 54 of the differential isolation amplifier. The output voltage at 54 is then equal to the electrical potential $E_Y$ at 44 minus the electrical potential $E_X$ at 42 but the terminal 54 is electrically isolated from terminals 42 and 44. FIG. 2 further shows an abreviated circuit symbol for the differential isolation amplifier. A voltage follower may be made by adding a positive voltage feed-back circuit to an operational amplifier as shown in FIG. 2. A suitable operational amplifier that may be used for this purpose as well as for taking the voltage differences between two inputs in a differential isolation amplifier is Fairchild μA 741.

Referring to FIG. 1, the voltage $E_R$ across resistor 14 is measured with the aid of differential isolation amplifier 26. The voltage $E_S$ across potential electrodes 22 and 24 is measured with the aid of differential isolation amplifier 28. Voltages $E_R$ and $E_S$ are therefore measured in a manner that does not substantially disturb the current through or the voltage across portion 4 of the earth formation 2 supplied by oscillator 12.

Referring to FIG. 1, the electrical response of the earth formation 2 to an alternating current between current electrodes 16 and 18 will typically be capacitive and resistive. It is accepted that at frequencies below 50 KHz an earth formation may be treated as a combination of a resistor and a capacitor placed in parallel. If the resistor has a resistance $R_S$ and the capacitor capacitance $C_S$ then the resistance $X_R$ of the combination is given by:

$$X_R = \frac{R_S}{1 + \omega^2 R_S^2 C_S^2} \quad (1)$$

where $\omega$ is the angular frequency of the current supplied by oscillator 12. The reactance $X_C$ of the combination is given by:

$$X_C = \frac{-\omega R_S^2 C_S}{1 + \omega^2 R_S^2 C_S^2} \quad (2)$$

The phase angle $\phi$ between the voltage across and current through the combination is given by:

$$\phi = \tan^{-1}\frac{X_C}{X_R} = \tan^{-1}(-\omega C_S R_S) \quad (3)$$

While Equation (1) is derived from a model for earth formation 2, Equation (1) may also be applied to a portion 4 of earth formation 2 to determine the resistance and capacitance of the portion which are given by $R_S$ and $C_S$ respectively. The phase angle $\phi$ greater than zero corresponds to voltage leading the current in the portion 4 of earth formation 2 while $\phi$ smaller than zero corresponds to voltage lagging current in the portion 4. At frequencies below 50 KHz the phase angle $\phi$ between the voltage and current in the formation is typically quite small. Experience with laboratory coresample measurements from formations with porosities of the order of 10% with water salinities of about 20 k ppm NaCl indicates that phase angles lie in the range of 0.1 degree to 1 degree. The reactance $X_C$ of the portion 4 is thus of the order of $10^{-2}$ to $10^{-3}$ times the resistance $X_R$ of the portion 4.

The current between current electrodes 16 and 18 flows through both the earth formation and the medium in the bore hole. This bore hole effect may be corrected in a conventional manner and the current through the earth formation may be found as a fraction $\alpha$ of the total current supplied by oscillator 12 to resistor 14. For a conventional method for calculating bore hole effects, see *The Fundamentals of Well Log Interpretation*, Academic Press, New York 3rd Ed., 1963 by M. R. J. Wyllie. The voltage $E_S$ across potential electrodes 22, 24 is given by:

$$E_S = \alpha(X_R + jX_C)I,$$

where $X_R$, $X_C$ are given by equations 1 and 2, and where I is the current transmitted by oscillator 12. Voltage $E_R$ across resistor 14 is given by:

$$E_R = RI$$

where R is the resistance of resistor 14. Dividing the two equations will give:

$$\frac{E_S}{E_R} = \frac{\alpha(X_R + jX_C)}{R}$$

Since $X_C$ is of the order of $10^{-2}$ to $10^{-3}$ times $X_R$, $X_C$ may be ignored in comparison to $X_R$. From equation (3), it is evident that if $\phi$ is small, $\omega R_S C_S$ is also small. Then from equation (1), $X_R$ is substantially equal to $R_S$. The resistance of the portion 4 of earth formation 2 is therefore given by:

$$R_S = \frac{RE_S}{\alpha E_R} \quad (4)$$

The resistance of portion 4 of earth formation 2 may be found in the manner described above. If the phase angle $\phi$ between the current through and voltage across portion 4 is measured, then Equation (3) gives the capacitance of portion 4. The dielectric constant of portion 4 of earth formation 2 may then be calculated from the capacitance in a conventional manner.

The contacts between current electrodes 16, 18 and the bore hole wall 20 add resistance and reactance to the circuit. If the voltage $E_S$ across a portion of the earth formation were measured between electrodes 16 and 18 instead of electrodes 22 and 24, the voltage $E_S$ measured would include the voltage drop across the contact impedances between electrodes 16, 18 and bore hole wall 20 in addition to the impedance of portion 4. Thus, the resistance $R_S$ given by equation (4) using voltage $E_S$ so measured would be the sum of the contact resistances and the resistance of portion 4 of earth formation 2. Frequently, such contact resistances are quite large and may introduce significant errors in the measurements.

To reduce the effects of such contact impedances, voltage $E_S$ across a portion of the earth formation is measured across potential electrodes 22 and 24 which are spaced apart from current electrodes 16 and 18. Differential isolation amplifier 28 measures the voltage across electrodes 22 and 24. Since the differential isolation amplifier 28 draws little current from the earth formation through electrodes 22 and 24, the voltage drops across such contacts are small so that the effects of the contact impedances will be less significant in the measurement of $E_S$.

If a current source and sink are placed in a homogeneous medium the pattern of current paths resembles the magnetic field of a magnetic dipole. Most of the current paths lie close to the line linking the current source and the current sink. While the earth formation to be investigated may not be entirely homogeneous in that it is traversed by a bore hole, the pattern of current paths between electrodes 16 and 18 also resembles the magnetic field of a magnetic dipole. Most of the current, therefore, between electrodes 16 and 18 flow along paths that are close to the bore hole wall. For that reason, potential electrodes 22 and 24 are preferably located between current electrodes 16 and 18 and in symmetrical relation thereto. Measured this way, the voltage $E_S$ between potential electrodes 22 and 24 will be large enough so that the effects of the contact impedances will be less significant.

Points on a surface normal to current paths between current electrodes 16, 18 are at the same electrical potential; the surface is known as an equipotential surface. Potential electrodes 22, 24 are situated on equipotential surfaces 6 and 8 respectively. If potential electrodes 22, 24 are moved to different locations in contact with the bore hole wall, the electrodes will be situated on equipotential surfaces different from 6 and 8. The portion 4 of earth formation 2 is defined by the portion of the formation bounded by surfaces 6, 8. Thus the location of potential electrodes 22, 24 in reference to current electrodes defines portion 4.

As discussed earlier, measurement of the phase angle between current through aand voltage across a portion of an earth formation will help determine the dielectric constant of the portion of formation. The current through earth formation 2 in FIG. 1 is in phase with voltage $E_R$ across resistor 14. Measurement of the phase angle between $E_S$ and $E_R$ will therefore provide the phase angle desired for the determination of the formation dielectric constant.

To determine the phase difference between $E_S$ and $E_R$ one method is to provide a voltage $E_Z$ that is in phase with $E_R$ but has the magnitude of $E_S$, then, as will be shown below, the phase angle $\phi$ is given by $|E_S - E_Z|/|E_S|$.

$$E_S = |E_S| e^{j(\beta+\phi)}, \text{ where } \beta \text{ is a function of time.} \quad (5)$$

$$E_R = |E_R| e^{j\beta}$$

$$E_Z = \frac{|E_S|}{|E_R|} E_R = \frac{|E_S|}{|E_R|} |E_R| e^{j\beta} = |E_S| e^{j\beta}$$

$$|E_S - E_Z| = ||E_S| e^{j(\beta+\phi)} - |E_S| e^{j\beta}|$$

$$= |E_S| |e^{j(\beta+\phi)} - e^{j\beta}|$$

$$= |E_S| |e^{j\beta}| |e^{j\phi} - 1|$$

$$= |E_S| |\cos\phi + j\sin\phi - 1|$$

Since $\phi$ is small, then approximately
$\cos\phi = 1$,
$\sin\phi = \phi$, and $$\frac{|E_S - E_Z|}{|E_S|} = |+j\phi| = \phi.$$

If $E_\phi$ is defined by $E_\phi = E_S - E_z$, then $$\frac{|E_\phi|}{|E_S|} = \phi$$

Figure 3:
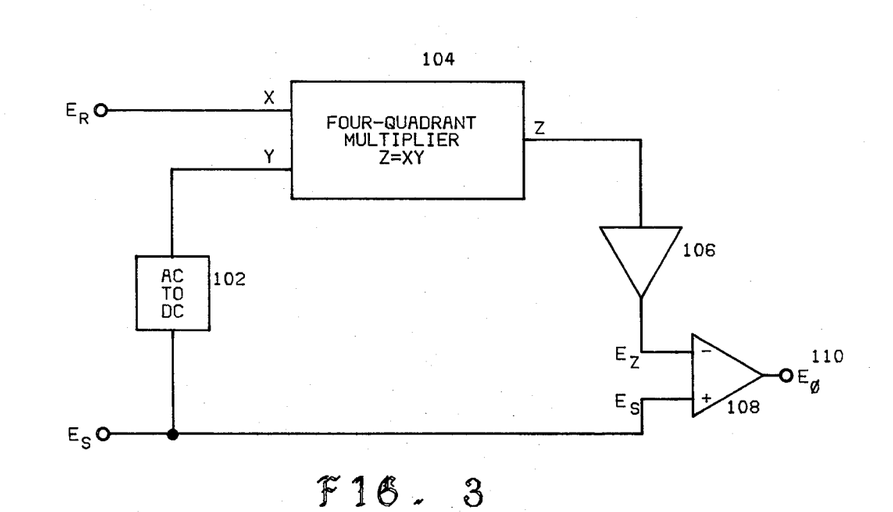
FIG. 3 is a schematic diagram of an electrical circuit for obtaining indications of the phase angle between the voltages measured with the apparatus in FIG. 1.

FIG. 3 shows an electrical circuit which may be used to obtain the voltage signals $E_Z$ if the current provided by oscillator 12 in FIG. 1 is of constant amplitude. Voltage $E_S$ is rectified by a filtered rectifier 102 to obtain $|E_S|$, substantially the magnitude of $E_S$. $E_R$ and $|E_S|$ are multiplied by a four-quadrant multiplier 104. The product is then amplified by an amplifier 106 with a predetermined gain to obtain voltage $E_Z$. $E_Z$ is subtracted from $E_S$ by operational amplifier 108 to obtain voltage $E_\phi$ at output 110. A commercially available integrated circuit that may be used as a four-quadrant multiplier is Motorola MC1494L.

The output voltage $E_Z$ from amplifier 106 is given by $K|E_S|E_R$. If $E_Z$ is to be the same as $$\frac{|E_S| E_R}{|E_R|},$$

which is the voltage signal to be generated, amplifier 106 is adjusted until the constant scale factor introduced by amplifier 106 has the value $1/|E_R|$. $E_R$ is substantially a constant since the current through resistor 14 has a substantially constant amplitude. This value of K may be set by using the same input voltage as $E_S$ and $E_R$ for the circuit in FIG. 3, and then adjusting the gain of amplifier 106 until $E_\phi$ is substantially zero.

Then $E_Z - E_S = 0$ $$K |E_S| E_R - E_S = 0$$

$$K = \frac{E_S}{E_R |E_S|}$$

Since the two input voltages $E_S$, $E_R$ are substantially the same $$E_S = E_R, \text{ and } K = \frac{E_R}{E_R |E_R|} = \frac{1}{|E_R|}.$$

If the gain of amplifier 106 is adjusted in the manner described above, the output voltage of amplifier 106 will be $K|E_S|E_R$, or substantially given by $$\frac{|E_S|}{|E_R|} E_R$$

which is the desired voltage signal $E_Z$. Amplifier 108 subtracts $E_Z$ from $E_S$ to obtain $E_\phi$. From equation (5), $$\frac{|E_\phi|}{|E_S|} = \frac{|E_S - E_Z|}{|E_S|} = \phi.$$

Combining equations (3), (4), and (5) gives $$\tan\phi = \tan\frac{|E_S - E_Z|}{|E_S|} = -\omega C_S \frac{E_S R}{a E_R}$$

The capacitance $C_S$ of portion 4 of earth formation 2 may then be calculated, from which the dielectric constant of portion 4 may be determined in a conventional manner.

Figure 4:
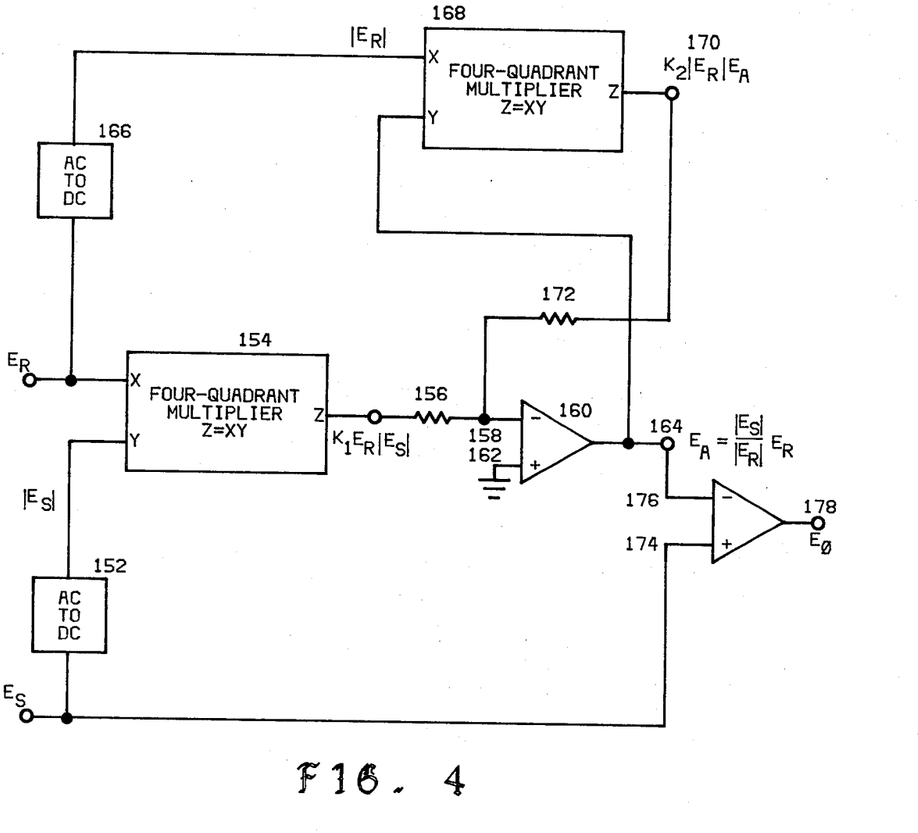
FIG. 4 is a schematic diagram of an alternate electrical circuit for obtaining indications of the phase angle between the voltages measured with the apparatus in FIG. 1.

FIG. 4 shows an alternate electric circuit for measuring the phase angle between $E_S$ and $E_R$ in FIG. 1 wherein the current from oscillator 12 need not be of constant amplitude. Voltage $E_S$ is connected to a filtered rectifier 152 to obtain substantially its amplitude $|E_S|$. Amplitude voltage $|E_S|$ is multiplied by $E_R$ by a four-quadrant multiplier 154 to produce a product voltage $K_1 E_R |E_S|$ where $K_1$ is a scale factor introduced by the four-quadrant multiplier 154. This output is connected to the virtual ground 158 of an operational amplifier 160 through a resistor 156, with resistance $R_1$. Voltage $E_R$ is connected to a filtered rectifier to obtain substantially its amplitude $|E_R|$. Amplitude voltage $|E_R|$ is multiplied by the output voltage $E_A$ of operational amplifier 160 by a four-quadrant multiplier 168 to obtain at output 170 a voltage of $K_2 |E_R| E_A$ where $K_2$ is a scale factor introduced by the four-quadrant multiplier 168. Output 170 is connected to the virtual ground 158 of operational amplifier 160 through a resistor 172 of having a resistance $R_2$. The current through resistor 172 is therefore equal to the current through resistor 156, hence, $$\frac{K_2 |E_R| E_A}{R_2} = \frac{K_1 E_R |E_S|}{R_1}$$

If $K_1 = K_2$ and $R_1 = R_2$ $$E_A = \frac{E_R |E_S|}{|E_R|} = E_Z \text{ and}$$

$$E_\phi = E_S - E_Z$$

Again, the ratio $|E_\phi|/|E_S|$ gives phase angle $\phi$. The capacitance and dielectric constant of portion 4 may be determined in a similar manner as that described in connection with the circuit in FIG. 3. In the above discussion, reference resistor 14 is employed to produce a signal $E_R$ in phase with the current through portion 4, so that signal voltage $E_Z$ may be generated conveniently. It will be appreciated that other manners of generating $E_Z$, a signal substantially with the amplitude of the voltage across portion 4 but the phase of the current through portion 4, may be used and come within the scope of this invention.

A commercially available integrated circuit that may be used as a four-quadrant multiplier suitable in the discussion above is Motorola MC1494L. Scale factors $K_1$ and $K_2$ may be set equal by adjustments of potentiometers in multiplier circuits in a conventional manner.

Figure 5:
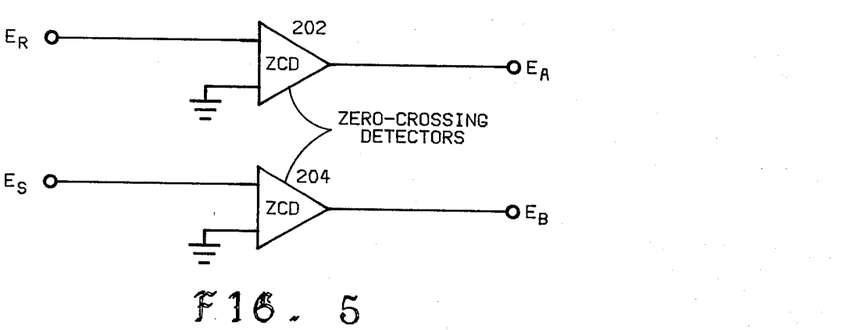
FIG. 5 illustrates two circuits for transforming the two voltages measured in FIG. 1 into two square wave voltages having substantially the same frequencies as their respective input voltages.

FIGS. 5, 6, 7 and 8 illustrate an alternative method of obtaining the phase angle between $E_S$ and $E_R$, the two voltages measured using the circuit shown in FIG. 1. FIG. 5 illustrates two circuits for transforming $E_S$ and $E_R$ into two square wave voltages, $E_A$ and $E_B$ respectively, having substantially the same frequencies as their respective input voltages. Voltage $E_R$ is connected to a zero-crossing detector 202 to provide a square wave output voltage $E_A$ having substantially the same frequency as $E_R$. Voltage $E_S$ is connected similarly to a zero-crossing detector 204 to provide a square wave output voltage $E_B$ having substantially the same frequency as $E_S$.

Figure 6:
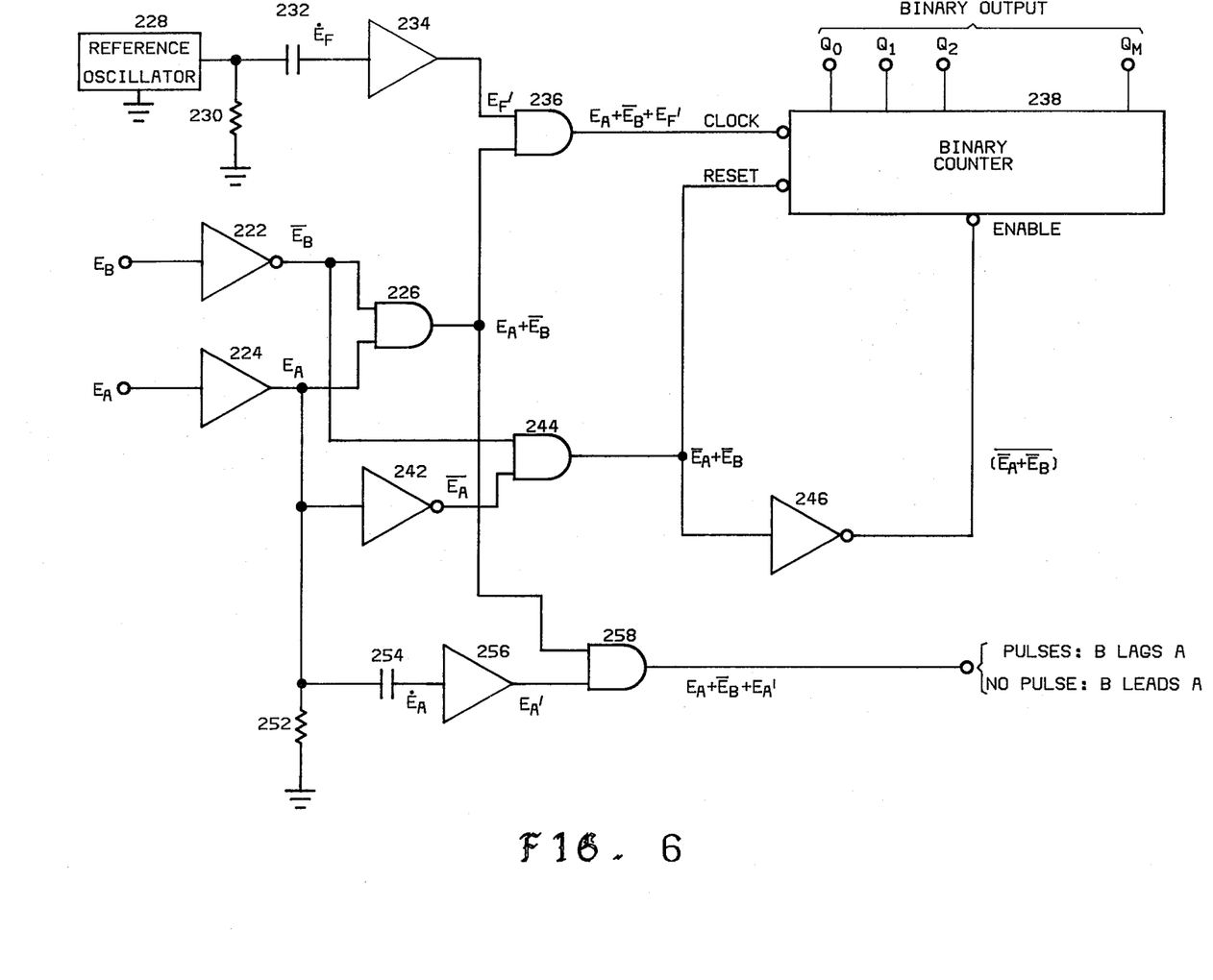
FIG. 6 is a schematic diagram of a digital circuit for determining the magnitude and the sign of the phase angle between the two square waves obtained with the apparatus in FIG. 5.

FIG. 6 shows a digital circuit for determining the magnitude and sign of the phase difference between the two square wave voltages $E_A$ and $E_B$. Signal voltage $E_B$ is supplied to an inverter 222 to provide signal $\overline{E_B}$. Signal voltage $E_A$ is supplied to a buffer gate 224. Signal $E_A$ is thereby adapted into a form recognizable by logic circuits. Buffer gate 224 also supplies sufficient current for more than one logic circuit.

Figure 7:
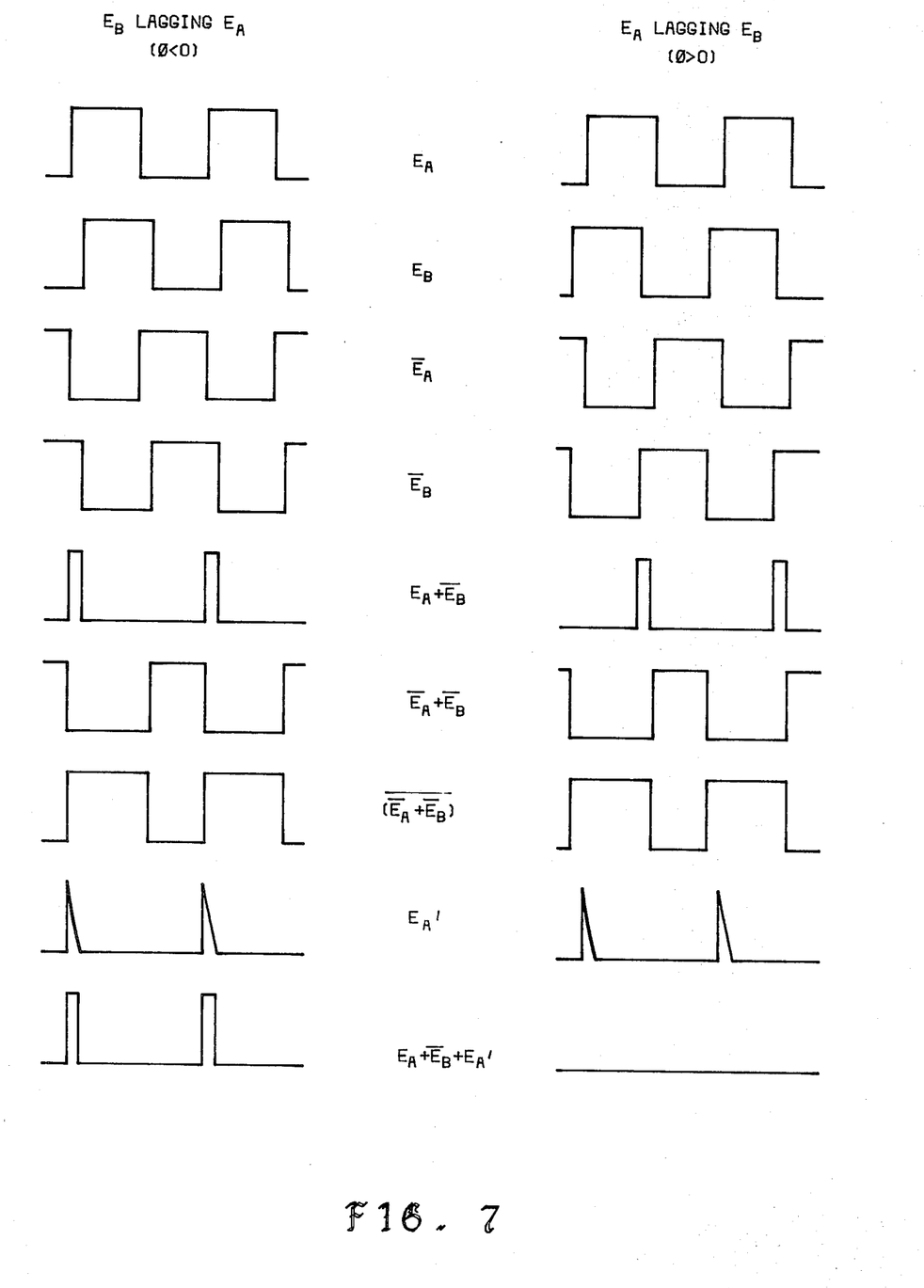
FIGS. 7 and 8 are graphical representations of voltages occurring in the apparatus shown in FIG. 6 during operation.

Signals $E_A$ and $\overline{E_B}$ are supplied to an AND gate to provide a signal $E_A + \overline{E_B}$. FIG. 7 is a graphical representation of voltages occurring in the apparatus shown in FIG. 6 during operation. From FIG. 7 it will be evident that the width of the pulse signal $E_A + \overline{E_B}$ measures the phase difference between $E_B$ and $E_A$. To measure the width of the pulse signal $E_A + \overline{E_B}$, a reference oscillator 228 and a binary counter 238 may be used. Preferably, reference oscillator 228 provides a high frequency square wave voltage $E_F$. A suitable high frequency is 10 megahertz. Reference oscillator 228 is connected to one end of a resistor 230 which is grounded at the other end. Reference oscillator 228 is also connected to an AND gate 236 through a capacitor 232 and a buffer gate 234. The capacitance of capacitor 232 and the resistance of resistor 230 are chosen such that the output voltage of capacitor 232 is the time derivative of $E_F$. A suitable capacitance that may be used for capacitor 232 may be from 10 to 100 pf and a suitable resistance for resistor 230 may be 200 ohms. Buffer gate 234 cuts off the negative voltage spikes from the output voltage of capacitor 232 to provide a voltage $E_F'$ having the same frequency as $E_F$ but in form of sharp pulses. signals $E_F'$ and $E_A + \overline{E_B}$ are supplied to an AND gate 236. The output signal $E_A + \overline{E_B} + E_F'$ is supplied to a binary counter 238 to be counted. Signal $E_A + \overline{E_B} + E_F'$ is shown graphically in FIG. 8. It will be appreciated that the high frequency pulse signal $E_F'$ may be generated in other manners which also come within the scope of this invention. As long as the output signal $E_A + \overline{E_B} + E_F'$ is obtained, different ways of connecting buffers 224, 234 and inverter 222 to AND gates 226 and 236 may be used and come within the scope of this invention.

Figure 8:
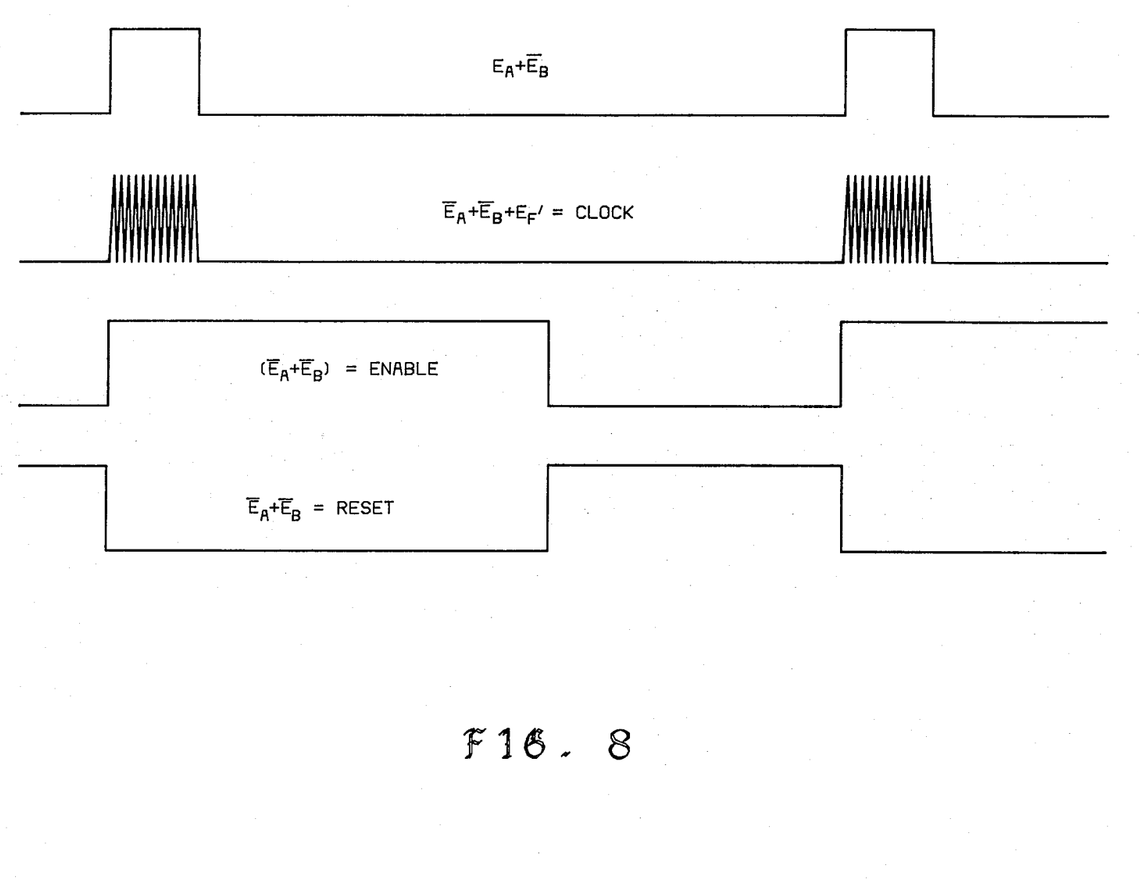

Signals $E_A$ and $E_B$ are each inverted and then supplied to an AND gate 244. This may be accomplished conveniently by supplying the output signal from buffer gate 224 to AND gate 244 through an inverter 242 and supplying the output signal from inverter 222 to AND gate 244. The output signal $\overline{E_A} + \overline{E_B}$ from AND gate 244 is illustrated in FIG. 7 and FIG. 8. Signal $\overline{E_A} + \overline{E_B}$ may be used to reset the binary counter 238 after counting each group of pulses in signal $E_A + \overline{E_B} + E_F'$. Signal $\overline{E_A} + \overline{E_B}$ may be supplied to an inverter 246 to provide an enabling signal $\overline{\overline{E_A} + \overline{E_B}}$. This enabling signal may be used to trigger binary counter 238 into action to start counting each group of pulses in signal $E_A + \overline{E_B} + E_F'$.

The output of buffer gate 224 is connected to one end of a resistor 252, the other end of which is grounded. The output of buffer gate 224 is also connected to an AND gate 258 through a capacitor 254 and a buffer gate 256. The output of AND gate 226 is connected to AND gate 258 so that AND gate 258 will provide an output signal $E_A + \overline{E_B} + E_A'$. For the same reasons as those discussed for signals $E_F'$ and $E_F$, $E_A'$ comprises sharp pulses at substantially the same frequency as $E_A$. Signals $E_A'$ and $E_A + \overline{E_B} + E_A'$ are illustrated graphically in FIG. 7. From FIG. 7 it will be evident that where signal $E_B$ lags $E_A$, signal $E_A + \overline{E_B} + E_A'$ comprises pulses but where signal $E_A$ lags $E_B$, signal $E_A + \overline{E_B} + E_A'$ will give no pulses. Signals $E_A$ and $E_B$ are in phase with signals $E_R$ and $E_S$, respectively. Whether the signal voltage $E_A + \overline{E_B} + E_A'$ will provide pulses indicates whether $E_R$ is leading or lagging $E_S$. Hence, the sign of the phase angle between signals $E_R$ and $E_S$ may be determined. It will be appreciated that other manners of deriving the signal $E_A + \overline{E_B} + E_A'$ from signals $E_A$ and $E_B$ may be used and come within the scope of this invention. The sign of the phase angle $\phi$ between signals $E_S$ and $E_R$ may be important where anomalously mineralized rocks are present in the earth's formations investigated. Measured at oscillator frequencies below 10 Hz the sign of the phase angle provides an indication of the presence or absence of such rocks. The reactance of an earth formation will be typically capacitive and the voltage $E_S$ typically lags the voltage $E_R$. Where the voltage $E_R$ lags the voltage $E_S$ it is an indication that either the various electrical circuits involved may not be functioning properly, or that the reactance of the earth formation is not predominantly capacitive.

As discussed earlier, the resistance $R_S$ of the portion 4 of earth formation 2 in FIG. 1 is given by $RE_S/\alpha E_R$. The ratio of $E_S$ to $E_R$ may be obtained in digital form using a logging multimeter. In reference to FIG. 9, analog voltages $E_S$, $E_R$ may be supplied to a logging multimeter 270, which provides a digital ratio of $E_S/E_R$. A suitable logging multimeter that may be used is Model No. 3467A manufactured by Hewlett Packard. See *Measurement/Computation Catalogue*, 1980, Hewlett Packard, pages 68, 69 for a detailed description of this multimeter.

Figure 10:
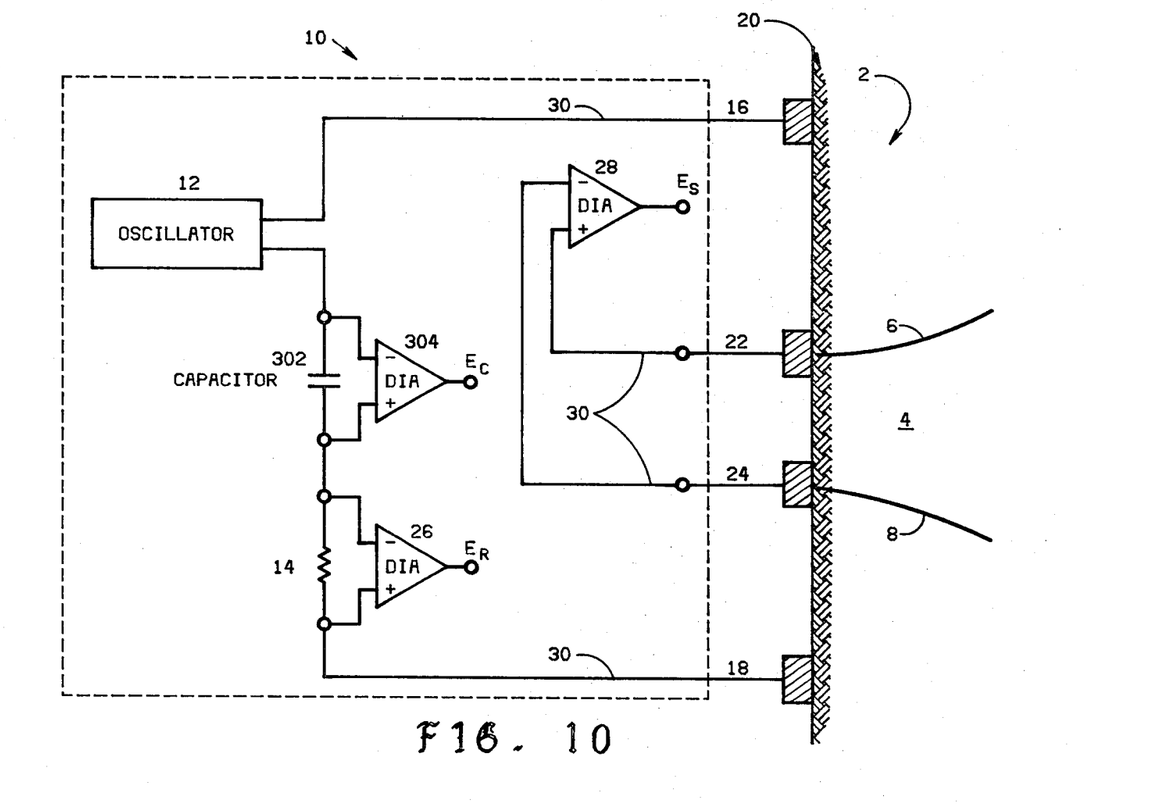
FIG. 10 is a schematic diagram of an alternate electrical curcuit constructed according to this invention for passing an alternating electric current through a subterranean formation traversed by a bore hole, and for measuring the voltages across a portion of the formation, a reference resistor and a reference capacitor.
Figure 11:
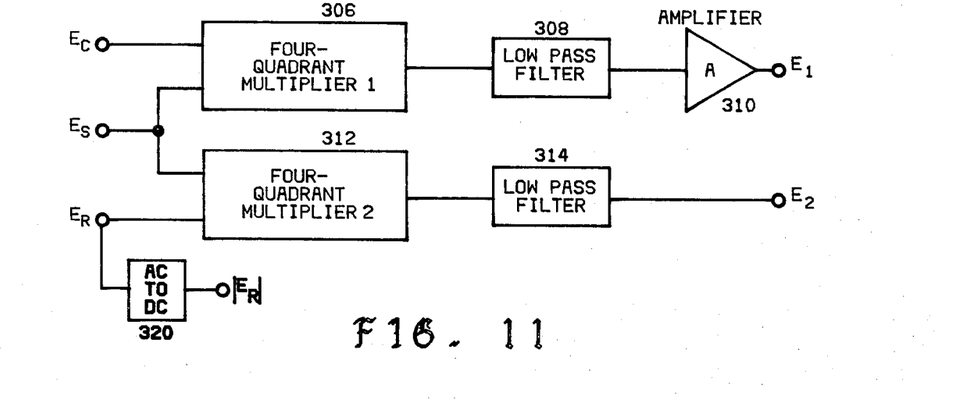
FIG. 11 is a schematic diagram of an electrical circuit for determining the capacitance of the portion of the formation from the voltage measurements in FIG. 9.

FIG. 10 shows an alternate electrical circuit constructed according to this invention for passing an alternating electric current through a subterranean formation traversed by a bore hole and for measuring the voltages across a portion of the formation, a reference resistor and a reference capacitor respectively. FIG. 10 is identical to FIG. 1 except that a capacitor 302 is added to the circuit so that the capacitor 302 is in series with oscillator 12 and resistor 14. A differential isolation amplifier 304 measures the voltage $E_C$ across capacitor 302. FIG. 11 is a schematic diagram of an electrical circuit for obtaining the capacitance of the portion of the formation from the voltage measurements using the apparatus in FIG. 10. Voltage $E_C$ and voltage $E_S$, the voltage across portion 4 of earth formation 2 are multiplied by a four-quadrant multiplier 306 and the output signal is passed through a low pass filter 308 and then amplified by amplifier 310 to provide a signal $E_1$. Voltage $E_S$ and voltage $E_R$, the voltage across resistor 14 are multiplied by a four-quadrant multiplier 312 and the output voltage is passed through a low pass filter 314 to provide a signal $E_2$.

Figure 9:
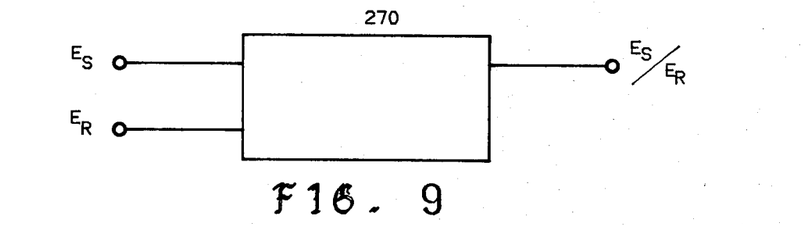
FIG. 9 is a schematic diagram of a circuit for obtaining the digital ratio of the magnitudes of the voltages measured with the apparatus in FIG. 1.

Preferably oscillator 12 provides a sinusoidal current I to the circuit in FIG. 9. I may be represented as $$I = I_o \cos \omega t$$

where
$I_o$ = amplitude of current I
$\omega$ = angular frequency of I
Then $$E_R = R I_o \cos \omega t$$

$$E_C = (-I_o/\omega C) \sin \omega t$$

and $$E_S = |Z| I_o \cos (\omega t + \phi),$$

where
R = resistance of resistor 14
C = capacitance of capacitor 302

Z = impedance of portion 4 of earth formation 2 and the adjacent bore hole
$\phi$ = phase angle between I and $E_S$.

Four-quadrant multiplier 306 multiplies $E_C$ and $E_S$;

$$E_C E_S = -|E_C| |E_S| \sin \omega t \cos (\omega t + \phi)$$

$$= \frac{|E_C| |E_S|}{2} [\sin \phi - \sin (2\omega t + \phi)]$$

The low pass filter 308 removes the voltage component $$\frac{|E_C| |E_S|}{2} \sin (2\omega t + \phi).$$

Since $\sin \phi$ is small, it is preferable to amplify the output from filter 308. The remaining D.C. level shift is amplified by a factor A by amplifier 310 to give an output voltage $E_1$ given by:

$$E_1 = A \frac{|E_C| |E_S|}{2} \sin \phi.$$

Since $\phi$ is very small, $$E_1 = A \frac{|E_C| |E_S|}{2} \phi.$$

Four-quadrant multiplier 312 multiplies $E_S$ and $E_R$:

$$E_S E_R = |E_R| |E_S| \cos \omega t \cos (\omega t + \phi)$$

$$= \frac{|E_R| |E_S|}{2} [\cos (2\omega t + \phi) + \cos \phi]$$

Low pass filter 314 removes the voltage component $$\frac{|E_R| |E_S|}{2} \cos (2\omega t + \phi)$$

to give an output voltage $E_2$ given by:

$$E_2 = \frac{|E_R| |E_S|}{2} \cos \phi.$$

No amplification is necessary in obtaining $E_2$ since $\cos \phi$ is nearly unity so that $E_2$ is not small. Where $\phi$ is very small, $\cos \phi \cong 1$. Hence $$E_2 = \frac{|E_R| |E_S|}{2} \text{ or } |E_R| = \frac{2E_2}{|E_S|}$$

$$E_R = R I_o \cos \omega t$$

$$E_C = \frac{-I_o}{\omega C} \sin \omega t$$

$$|E_C| = \frac{1}{\omega RC} |E_R|$$

$$E_1 = A \frac{|E_S|}{2} \phi \frac{1}{\omega RC} |E_R|$$

$$= A \frac{|E_S|}{2} \phi \frac{1}{\omega RC} \frac{2E_2}{|E_S|}$$

$$\phi = \frac{\omega RC}{AE_2} E_1$$

Since $\phi$ is small, equation (3) becomes:

$$\phi = -\omega C_S R_S. \quad (6)$$

Then $\dfrac{\omega RC}{AE_2} E_l = -\omega C_S R_S$

From equation (4), $$R_S = \dfrac{RE_S}{\alpha E_R} \quad$$

Since $\phi$ is small and hence $E_S$, $E_R$ are almost in phase with each other, $$\dfrac{E_S}{E_R} = \dfrac{|E_S|}{|E_R|}. \quad (7)$$

$$R_S = \dfrac{R}{\alpha} \dfrac{|E_S|}{|E_R|}$$

$$= \dfrac{R}{\alpha |E_R|} \dfrac{2E_2}{|E_R|}$$

Combining equations (6) and (7) gives:

$$C_S = -\dfrac{\alpha C |E_R|^2 E_1}{2AE_2^2}$$

Voltage $E_R$ is supplied to a filtered rectifier 320 to obtain $|E_R|$, substantially the magnitude of $E_R$. All the other quantities necessary for determining $C_S$ are known. The dielectric constant of portion 4 of earth formation 2 may be calculated from $C_S$ and other parameters in a conventional manner.

We claim:

1. An apparatus for determining the dielectric constant of a portion of an earth formation traversed by a bore hole, comprising:
   a current source capable of supplying alternating current of a substantially constant magnitude to said portion of the earth formation;
   a reference resistor connected in series with the current source and said portion;
   a first differential isolation amplifier for measuring the voltage across said portion of the earth formation;
   a second differential isolation amplifier for measuring the voltage across the reference resistor;
   means for generating a positive first voltage with substantially the magnitude of the voltage across said portion;
   a four-quadrant multiplier having as inputs the voltage across the reference resistor and the positive first voltage generated;
   a first amplifier with a predetermined gain connected to the multiplier for amplifying the multiplier output so that the output voltage of the first amplifier is substantially in phase with the voltage across the reference resistor but has substantially the magnitude of the voltage across said portion; and
   a second amplifier for taking the voltage difference $E\phi$ between the voltage across said portion and the output voltage of the first amplifier so that the capacitance $C_s$ of said portion may be determined from the relationship:

$$\tan\left|\dfrac{E\phi}{E_s}\right| = -\omega C_s \dfrac{E_s R}{\alpha E_R}$$

wherein
$E_s$ = the voltage across aid portion;
$E_R$ = the voltage across the reference resistor;
R = the resistance of the reference resistor;
$\omega$ = the angular frequency of the alternating current; and
$\alpha$ = the bore hole correction factor.

2. An apparatus for determining the dielectric constant of a portion of an earth formation traversed by a bore hole comprising:
   a current source capable of supplying alternating current to said portion of the earth formation;
   a reference resistor connected in series with the current source and with said portion of the earth formation;
   means for measuring the voltage across the reference resistor;
   means for measuring the voltage across said portion of the earth formation;
   means for generating a positive voltage with substantially the magnitude of the voltage across said portion;
   means for generating a positive voltage with substantially the magnitude of the voltage across the reference resistor;
   a first four-quadrant multiplier for multiplying the voltage across the reference resistor and the positive voltage generated with the magnitude of the voltage across said portion;
   a first operational amplifier with the negative input at virtual ground;
   a first resistor connecting the output of said first multiplier to the negative input of the first operational amplifier;
   a second four-quadrant multiplier for multiplying the positive voltage generated having substantially the magnitude of the voltage across the reference resistor and the output voltage of the first operational amplifier; and
   a second resistor connecting the output of said second multiplier to the negative input of the first operational amplifier so that the output voltage of the first operational amplifier has substantially the magnitude of the voltage across said portion and is substantially in phase with the voltage across the reference resistor; and
   a second operational amplifier for taking the voltage difference $E\phi$ between the voltage across said portion and the output voltage of the first operational amplifier so that the capacitance $C_s$ of said portion may be determined from the relationship:

$$\tan\left|\dfrac{E\phi}{E_s}\right| = -\omega C_s \dfrac{E_s R}{\alpha E_R}$$

wherein
$E_s$ = the voltage across said portion;
$E_R$ = the voltage across the reference resistor;
R = the resistance of the reference resistor;

ω = the angular frequency of the alternating current; and

α = the bore hole correction factor.

3. The apparatus of claim 2 wherein said means for measuring the voltage across said portion comprises a first differential isolation amplifier and said means for measuring the voltage across the reference resistor comprises a second differential isolation amplifier.

4. The apparatus of claims 1 or 3, further comprising:
a pair of spaced apart current electrodes which connect the current source and the reference resistor to the bore hole wall for passing current through said portion; and
a pair of spaced-apart potential electrodes which connect the first differential isolation amplifier to the bore hole wall for measuring the voltage across said portion of the earth formation, wherein said pair of potential electrodes are spaced apart from said pair of current electrodes, and wherein said pair of potential electrodes measures the voltage across two equipotential surfaces defining the extremities of said portion of the earth formation.

5. The apparatus of claim 4, wherein said pairs of potential electrodes and current electrodes are placed in contact with the bore hole wall so that said pair of potential electrodes are located between and in symmetrical relation to said pair of current electrodes.

6. A method for determining the dielectric constant of a portion of an earth formation traversed by a bore hole, comprising:
passing an alternating current through said portion of the earth formation, a reference resistor and a capacitor wherein said resistor and said capacitor are connected in series with said portion;
generating a first signal substantially proportional to the product of the signal voltages across said portion of the earth formation and across the capacitor;
filtering out substantially the high frequency components from said first signal to obtain a second voltage signal substantially proportional to the product of (a) the magnitude of the signal voltage across said portion, (b) the magnitude of the signal voltage across the capacitor, and (c) the phase angle $\phi$ between the voltage across said portion and the voltage across the reference resistor;
generating a third signal substantially proportional to the product of the signal voltages across said portion of the earth formation and across the reference resistor; and
filtering out substantially the high frequency components from said third signal to obtain a fourth voltage signal substantially proportional to the product of the magnitudes of the signal voltages across said portion and across the reference resistor; and
determining the capacitance $C_S$ of said portion of the earth formation by the relationship:

$$C_S = -\frac{\alpha C |E_R|^2 E_1}{2AE_2^2}$$

wherein
$\alpha$ = a bore hole correction factor;
$|E_R|$ = the magnitude of the voltage signal across the reference resistor;
$E_1$ = the second voltage signal;
$C$ = the capacitance of the capacitor;
$A$ = a predetermined constant; and
$E_2$ = the fourth voltage signal.

7. An apparatus for determining the dielectric constant of a portion of an earth formation traversed by a bore hole, comprising:
a reference resistor;
a capacitor;
an alternating current source connected in series with the reference resistor, the capacitor and said portion of the earth formation;
means for measuring the voltage across said portion of the earth formation;
means for measuring the voltage across the capacitor;
means for measuring the voltage across the reference resistor;
a first four-quadrant multiplier to provide a first voltage signal substantially proportional to the product of the voltage across the capacitor with the voltage across said portion;
a first low pass filter connected to said first four-quadrant multiplier for filtering out substantially the high frequency components of the output voltage of said first multiplier to obtain a second voltage signal substantially proportional to the product of (a) the magnitude of the signal voltage across said portion, (b) the magnitude of the signal voltage across the capacitor, and (c) the phase angle $\phi$ between the voltage across said portion and the voltage across the reference resistor;
a second four-quadrant multiplier to provide a third voltage signal substantially proportional to the product of the voltage across said portion with the voltage across the reference resistor; and
a second low pass filter connected to said second four-quadrant multiplier for filtering out substantially the high frequency components of the output voltage of said second multiplier to obtain a fourth voltage signal substantially proportional to the product of the magnitudes of the signal voltages across said portion and across the reference resistor; and
a filtered rectifier for obtaining a positive voltage having substantially the magnitude of the voltage across the reference resistor, so that the capacitance $C_S$ of said portion of the earth formation may be determined by the relationship:

$$C_S = -\frac{\alpha C |E_R|^2 E_1}{2AE_2^2}$$

wherein
$\alpha$ = a bore hole correction factor;
$|E_R|$ = the magnitude of the voltage signal across the reference resistor;
$E_1$ = the second voltage signal;
$C$ = the capacitance of the capacitor;
$A$ = a predetermined constant; and
$E_2$ = the fourth voltage signal.

8. An apparatus as in claim 7, further comprising an amplifier for amplifying the output voltage from said first low pass filter.

9. An apparatus as in claim 7, wherein each of said capacitor voltage measuring means, said reference resistor voltage measuring means, and said means for measuring the voltage across said portion comprises a differential isolation amplifier.

10. An apparatus as in claim 7, further comprising:

two spaced apart current electrodes in the bore hole connected to said alternating current source for passing an alternating current through the earth formation;

two spaced apart potential electrodes connected to the bore hole wall and said means for measuring the voltage across said portion, said potential electrodes being spaced apart from said current electrodes, wherein said two potential electrodes measure the voltage across two equipotential surfaces defining the extremities of said portion of the earth formation.

11. An apparatus as in claim 10, wherein said two potential electrodes and said two current electrodes are placed in contact with the bore hole wall in such manner that said two potential electrodes lie between and in symmetrical relation to said two current electrodes.

* * * * *